Feb. 2, 1937.  L. J. ANDRES  2,069,639
LUBRICATING SYSTEM
Filed May 14, 1934
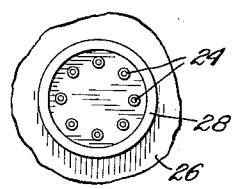
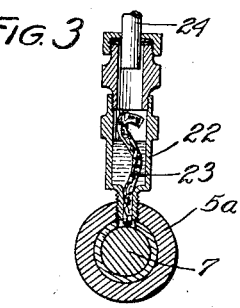
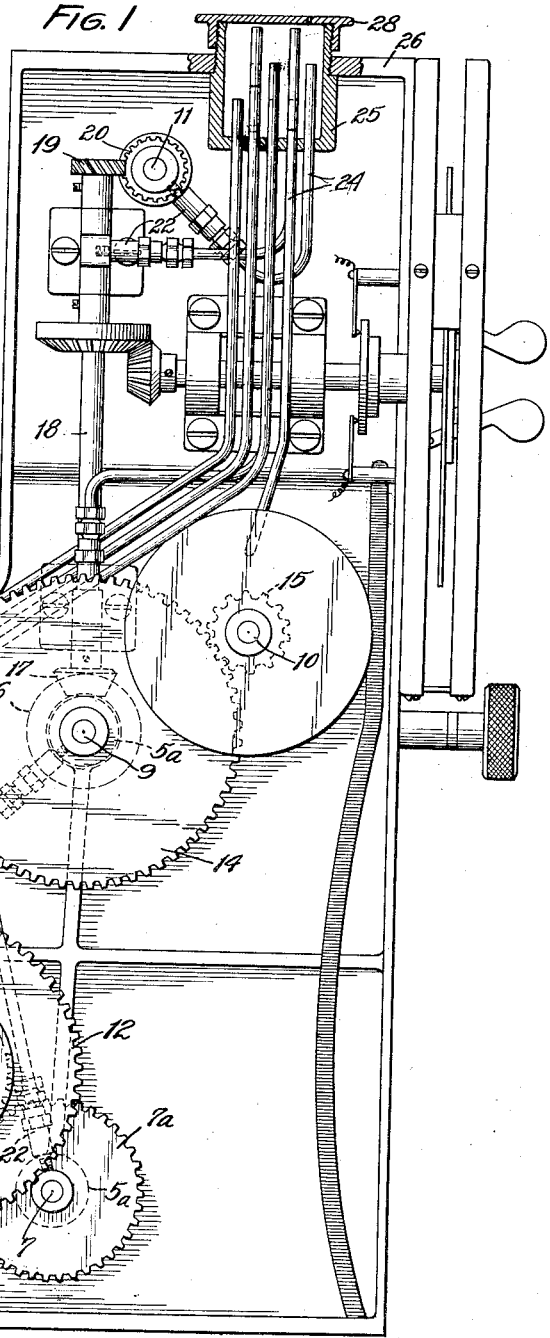
Inventor:
Lloyd J. Andres
By John E. Titus Atty.

Patented Feb. 2, 1937

2,069,639

UNITED STATES PATENT OFFICE 2,069,639

LUBRICATING SYSTEM

Lloyd J. Andres, Grand Rapids, Mich., assignor to Automatic Musical Instrument Company, Grand Rapids, Mich., a corporation of Michigan Application May 14, 1934, Serial No. 725,469

6 Claims. (Cl. 184—6)

This invention relates to improvements in oiling systems for such machines as moving picture projectors and the like which have a plurality of shafts or other moving parts which run at different speeds and loads, and require constant lubrication but in different proportions.

For example, a motion picture projector has shafts and parts such as the intermittent drive which require a continuous supply of light oil to the rapidly moving rubbing surfaces, and other parts, such as the film guide sprocket shafts, which revolve continuously under light load and therefore only require a few drops of oil for a long period of operation, while the intermittent drive requires perhaps several drops a minute.

Also the intermittent drive parts are usually well enclosed and there is very little leakage while the machine is standing idle. But an over supply of oil to the plain shaft bearings would be apt to run through the bearings faster than the oil is turned into vapor or otherwise used up and thus cause an annoying accumulation of oil in the machine and on the parts which come into contact with the film.

Also it is desirable to be able to oil the entire machine at one time instead of it being necessary to oil some particular parts quite frequently and other parts only occasionally since it is rather difficult to remember such complicated requirements, the usual result being that some bearings get an over supply of oil and others do not get enough.

While objects of the present invention include the provision of means for eliminating undesirable conditions mentioned above, other objects and advantages are to provide a system in which the oil may be supplied in small containers holding a sufficient quantity of oil to supply the entire machine for a predetermined amount of operation, such as for a given length of film. Then all that is required of the operator is to empty one of the containers into the oil supply reservoir at definite intervals. This also insures the use of the proper grade as well as quantity of lubricant, as the containers may be prepared directly by the manufacturer of the machine.

In the accompanying drawing, this invention is shown as applied to a sound-picture projector, such as is disclosed in my application, Serial Number 716,595, filed March 21, 1934.

Fig. 1 is a side elevation of a sound-picture projector in which my invention is embodied; the cover being removed from the gear train compartment and parts being shown in section.

Fig. 2 is a plan view of the oil supply reservoir.

Fig. 3 is a cross section of one of the wick tubes.

The projector comprises, briefly, a housing 4 in a division wall 5 of which, are rotatably mounted in suitable bosses 5a, a continuously rotated sound take-off drive shaft 6 to which the power for driving the machine is connected; a hold-back or outlet sprocket wheel shaft 7; a stub shaft 8; a hold-back sprocket wheel shaft 9; a shaft 10 for actuating the intermittent film drive sprockets, not shown; and a feed sprocket wheel shaft 11.

Said shafts are suitably connected to the shaft 6 through a gear train comprising a gear 6a, mounted on the shaft 6 which meshes with a similar gear 7a fixedly mounted on the shaft 7; a gear 12, connected to the gear 6a and meshing with an idler gear 13 rotatably mounted on the shaft 8. The gear 13 meshes with a gear 14 fixed to the shaft 9 and driving a pinion 15 which, it is to be understood, actuates the intermittent film drive mechanism, not shown.

On the shaft 9 is keyed a bevel gear 16 for driving the shaft 11, the gear 16 being in mesh with a mating gear 17 mounted on a jack shaft 18 which is connected to the shaft 11 through a pair of spiral gears 19 and 20.

In the hubs or bosses 5a of each shaft, as shown in Fig. 3, is threaded a tube 22 having a wick 23 therein for feeding the oil by capillary attraction to the shaft. The tube forms a small reservoir or pocket gland for the oil, and each bearing is connected by a pipe 24 leading from the upper end of the tube to an oil reservoir 25 which is mounted in the upper wall 26 of the housing 4.

The pipes 24 extend through the bottom of the main reservoir 25; and, in order to supply oil to each bearing in proportion to the lubrication requirements thereof, the ends of the pipes are extended to different levels in the reservoir.

In use a small container, having enough oil to run the machine for the desired period, is emptied into the reservoir 25, which has a vented and threaded cover 28. The oil flows into all of the tubes, carrying a supply down to the oil wick chambers which stops as soon as the level of the oil in the reservoir falls below the end of each tube. Thus a few drops of oil may be supplied to some of the oil wick chambers while the others will receive oil as long as there is any left in the reservoir. The flow through the wicks is of course automatically controlled more or less according to the rate at which the oil is used up in the particular bearing, and where the oil is used very fast, more oil is supplied.

Having thus described my invention, I claim:

1. In a machine having a plurality of shaft bearings, a small oil reservoir mounted on each bearing and having a wick for supplying the oil to the bearing, a main reservoir having a capacity for supplying a sufficient quantity of oil to supply the bearings for a predetermined period of operation of the machine, and a pipe leading from each small reservoir to the main reservoir, the pipes opening into the main reservoir at different levels so that at each filling of the main reservoir each small reservoir is supplied with a part of the full capacity of the main reservoir in proportion to the relative lubrication requirements of its bearing.

2. In a machine having a plurality of shaft bearings, an oil wick tube threaded into each of the bearings and having a wick for supplying oil to the related bearing, an oil reservoir situated above all of the bearings and having a capacity for supplying a sufficient amount of oil to lubricate the bearings for a predetermined period of operation of the machine, and a pipe leading from each of the wick tubes to the reservoir, the openings of the pipes into the reservoir being at different levels said levels being in inverse proportion to the amount of oil required to lubricate the corresponding bearings for said period.

3. In a machine having a plurality of parts requiring different amounts of lubricant, a gravity flow oiling system comprising an open reservoir mounted above said parts, a plurality of ducts opening into the reservoir, one duct leading to each of said parts, and the openings of the ducts arranged at different heights in the reservoir, said difference in height being inversely proportional to the largest amount of lubricant supplied to any of the parts.

4. In a machine having a plurality of parts requiring different amounts of lubrication, a gravity feed oil reservoir mounted above said parts, and a differential oil distribution system for supplying lubricant to the several parts comprising ducts having openings at different levels into the reservoir, said levels being inversely proportional to the amount of lubricant supplied to the parts from one filling of the reservoir.

5. A lubricating system comprising a plurality of parts requiring different amounts of lubricant, a gravity flow distributing system comprising a reservoir mounted above said parts, a plurality of ducts opening into the reservoir, one duct leading to each of said parts, and the height of each duct opening being inversely proportional to the supply of lubricant furnished to the corresponding part from one filling of the reservoir.

6. In a machine having a plurality of parts requiring different amounts of lubricant, a small reservoir adjacent each part, a main reservoir having a capacity for supplying a sufficient quantity of lubricant to supply the parts for a predetermined period of operation, a pipe leading from each small reservoir to the main reservoir, and the openings of the pipes into the reservoir being at different levels said level being inversely proportional to the amount of lubricant required for the corresponding part for said period.

LLOYD J. ANDRES.